US012730368B2

(12) United States Patent
Guo et al.

(10) Patent No.: US 12,730,368 B2
(45) Date of Patent: Sep. 8, 2026

(54) LIGHT SOURCE DEVICE

(71) Applicant: APPOTRONICS CORPORATION LIMITED, Shenzhen (CN)

(72) Inventors: Zuqiang Guo, Guangdong (CN); Peng Du, Guangdong (CN); Yingxiong Xie, Guangdong (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 829 days.

(21) Appl. No.: 17/853,764

(22) Filed: Jun. 29, 2022

(65) Prior Publication Data

US 2022/0334460 A1 Oct. 20, 2022

Related U.S. Application Data

(63) Continuation of application No. PCT/CN2020/137095, filed on Dec. 17, 2020.

(30) Foreign Application Priority Data

Dec. 31, 2019 (CN) ........................ 201911414478.8

(51) Int. Cl.
*G03B 21/20* (2006.01)
*G03B 21/28* (2006.01)

(52) U.S. Cl.
CPC ..... *G03B 21/2073* (2013.01); *G03B 21/2013* (2013.01); *G03B 21/204* (2013.01); *G03B 21/206* (2013.01); *G03B 21/28* (2013.01)

(58) Field of Classification Search
CPC ............ G03B 21/2073; G03B 21/2013; G03B 21/204; G03B 21/206; G03B 21/28
(Continued)

(56) References Cited

U.S. PATENT DOCUMENTS 5,526,063 A * 6/1996 Joubert ................ H04N 9/3164 348/751
2003/0179346 A1* 9/2003 Mihara ................ H04N 9/3164 353/31
(Continued)

FOREIGN PATENT DOCUMENTS

CN 103543589 A 1/2014
CN 104062837 A 9/2014
(Continued)

OTHER PUBLICATIONS

Translation of 2007206359 (Year: 2024).*
(Continued)

*Primary Examiner* — Jerry L Brooks
(74) *Attorney, Agent, or Firm* — Tarolli, Sundheim, Covell & Tummino LLP

(57) ABSTRACT

Provided is a light source device, including a first light source module configured to output a first light beam; a second light source module configured to output a second light beam, etendue of the first light beam being smaller than etendue of the second light beam; a polarization conversion system configured to receive the first light beam and the second light beam and perform polarization conversion on at least one of the first light beam the second light beam; and an etendue increasing module provided on a light path between the first light source module and the polarization conversion system and configured to increase the etendue of the first light beam. Etendue of the first light beam incident on the PCS increases and the optical power density of the first light beam incident on the PCS decreases, thereby preventing overheating from affecting reliability of the polarization conversion system.

13 Claims, 4 Drawing Sheets

(58) Field of Classification Search
USPC ............................................................ 353/20
See application file for complete search history.

(56) References Cited

U.S. PATENT DOCUMENTS

| | | | | |
|---|---|---|---|---|
| 2004/0196443 | A1* | 10/2004 | Tomita ................. | G02B 27/285 348/E9.027 |
| 2012/0051044 | A1* | 3/2012 | Akiyama ............. | G03B 21/204 362/233 |
| 2012/0200216 | A1* | 8/2012 | Okazaki .................. | H01J 61/86 313/113 |
| 2019/0268578 | A1 | 8/2019 | Koizumi | |
| 2019/0391474 | A1 | 12/2019 | Akiyama | |

FOREIGN PATENT DOCUMENTS

| | | | | | |
|---|---|---|---|---|---|
| CN | 105339818 A | | 2/2016 | | |
| CN | 107797369 A | | 3/2018 | | |
| CN | 109407453 A | | 3/2019 | | |
| CN | 110174812 A | * | 8/2019 | ........... | G03B 21/006 |
| CN | 108027550 B | * | 11/2020 | ......... | G03B 21/2066 |

OTHER PUBLICATIONS

Translation of DE 10145962 A1 (Year: 2025).*
Translation of CN 108027550 (Year: 2025).*
International Search Report dated Mar. 10, 2021, for corresponding International Application No. PCT/CN2020/137095.

* cited by examiner

LIGHT SOURCE DEVICE

CROSS-REFERENCE TO RELATED APPLICATIONS

This application is a continuation of International Application No. PCT/CN2020/137095, filed on Dec. 17, 2020, which claims priority to Chinese Patent Application No. 201911414478.8, filed on Dec. 31, 2019. All of the aforementioned applications are hereby incorporated by reference in their entireties.

TECHNICAL FIELD

The present disclosure relates to the technical field of projection, and in particular to a light source device.

BACKGROUND

Polarization devices are required for the polarization projection display system that is designed based on the working mode of polarized light. Traditional light sources are unpolarized light sources, and directly converting unpolarized light into polarized light will lose at least 50% of the energy. To solve this problem, the polarizing devices are used to polarize the unpolarized light, and convert one of the polarized components to another one, such that the unpolarized light is output in a certain polarization state. The output polarized light holds more than 80% of the energy of the original unpolarized light.

The commonly used polarizing devices include a polarization beam splitting prism (PBS) and a polarization conversion system (PCS). The polarization beam splitting prism can split the incident unpolarized light into two linearly polarized light beams, which are perpendicular to each other. The P-polarized light is transmitted completely, and the S-polarized light is reflected at an angle of 45° and exits at an angle of 90° relative to the P-polarized light. Alternatively, the S-polarized light is transmitted completely, and the P-polarized light is reflected at an angle of 45° and exits at an angle of 90° relative to the S-polarized light. The polarization beam splitting prism is formed by a pair of rectangular prisms that is glued together, one of which is coated with a polarization beam splitting prism film on a bevel edge. The PCS includes polarization beam splitting prisms that are glued together and ½ wave plates connected at each path of the P-polarized light or S-polarized light. The P-polarized light is converted to S-polarized light or the S-polarized light is converted to P-polarized light, such that the light exiting from the PCS has only one polarization state.

SUMMARY

An aspect of the present disclosure provides a light source device. The light source device includes a first light source module, a second light source module, a polarization conversion system and an etendue increasing module. The first light source module is configured to output a first light beam. The second light source module is configured to output a second light beam. Etendue of the first light beam is smaller than etendue of the second light beam. The polarization conversion system is configured to receive the first light beam and the second light beam and perform polarization conversion on at least one of the first light beam and the second light beam. The etendue increasing module is provided on a light path between the first light source module and the polarization conversion system and configured to increase the etendue of the first light beam.

An aspect of the present disclosure provides a light source device. The light source device includes a first light source module, a second light source module, a polarization conversion system, and a light combining module. The first light source module is configured to output a first light beam. The second light source module is configured to output a second light beam, wherein etendue of the first light beam is smaller than etendue of the second light beam. The polarization conversion system configured to receive the second light beam and perform polarization conversion on the second light beam. The light combining module arranged on a light exiting path of the polarization conversion system, and configured to combine the second light beam exited from the polarization conversion system and the first light beam not passed through the polarization conversion system.

BRIEF DESCRIPTION OF DRAWINGS

To describe the technical solutions in the embodiments of the present disclosure or in the prior art more clearly, the following briefly describes the drawings required for describing the embodiments of the present disclosure or the prior art. Apparently, the drawings in the following description show merely some embodiments of the present disclosure, and those of ordinary skill in the art may still derive other drawings from these drawings without creative efforts.

DETAILED DESCRIPTION

Figure 1:
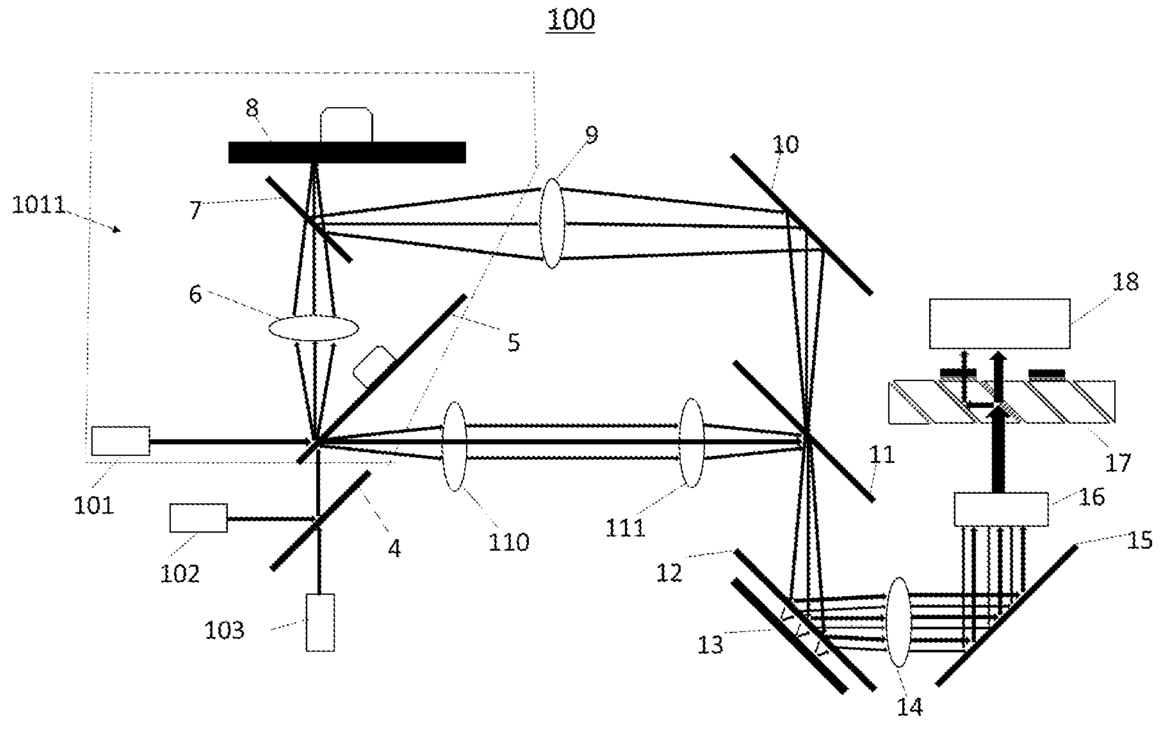
FIG. 1 is a schematic diagram of a light path of a light source device according to an embodiment of the present disclosure.

The technical solutions in the embodiments of the present disclosure are described in detail below with reference to the drawings in the embodiments of the present disclosure. Apparently, the described embodiments are merely some rather than all of the embodiments of the present disclosure. All other embodiments obtained by those of ordinary skill in the art based on the embodiments of the present disclosure without creative efforts should fall within a protection scope of the present disclosure.

The "embodiment" mentioned herein means that a specific feature, structure or characteristic described in combination with the embodiment may be included in at least one embodiment of the present disclosure. The term appearing in different parts of the specification does not necessarily refer to the same embodiment or an independent or alternative embodiment exclusive of other embodiments. It may be explicitly or implicitly appreciated by those skilled in the art that an embodiment described herein may be combined with another embodiment.

The PCS is widely used in scenarios where light of a single polarization state is required. However, the connection between the prisms of the PCS and the connection between the ½ wave plates and the prisms need to be realized by glue. As an organic material, glue is not resistant to high temperature, and excessive temperature will accelerate aging of the glue, thereby reducing the reliability of the PCS.

Laser light has superior polarization properties compared with ordinary light. Compared with light sources such as xenon light, laser light sources feature small spot size, small etendue and high optical power density. However, under a same optical power, when the laser light is incident on the glue, the heat generated per unit area of the glue is more than that generated by other light.

The present disclosure provides a light source device, which solves the problem in the prior art that the reliability of a polarization conversion system is reduced due to overheating caused by incident light.

The present disclosure provides a light source device, including a first light source module configured to output a first light beam, a second light source module configured to output a second light beam, a polarization conversion system (PCS) and an etendue increasing module. The PCS receives the first light beam and the second light beam, and performs polarization conversion on the first light beam and/or the second light beam. The etendue of the first light beam is smaller than the etendue of the second light beam. The etendue increasing module is provided on a light path between the first light source module and the PCS, and is configured to increase the etendue of the first light beam. It solves the problem that the reliability of the PCS is reduced due to overheating caused by the excessive optical power density of the first light beam incident on the PCS. Generally, the first light source module is a laser device, and the first light beam is a laser light source.

FIG. 1 is a schematic diagram of a light path of a light source device 100 according to an embodiment of the present disclosure. The light source device 100 includes a first light source module 101, a second light source module 1011 and a reflective and transmissive wheel 5. The reflective and transmissive wheel 5 is a wheel having a reflective section and a transmissive section. The first light source module 101 is configured to emit a first light beam. A part of the first light beam is used as primary color light of the light source device 100, and another part of the first light beam is used as an excitation light source of the second light source module 1011.

The light source device 100 further includes relay lens assemblies 110 and 111, a first light splitting sheet 11, a second light splitting sheet 12, a scattering element 13, a collimating lens 14, a first reflector 15, a light homogenizing assembly 16, a PCS 17, a first lens assembly 6, a third light splitting sheet 7, a wavelength conversion device 8, a lens assembly 9 and a second reflector 10.

The first light beam emitted by the first light source module 101 is transmitted through the reflective and transmissive wheel 5, passes through the relay lens assemblies 110 and 111, and then converges on the first light splitting sheet 11. The first light splitting sheet 11 is a coating film, with a small reflection region at the center and a transmission region around the center. When the first light beam is incident on the first light splitting sheet 11, it is reflected to the second light splitting sheet 12 by the region at the center of the first light splitting sheet 11. The second light splitting sheet 12 is a dichroic sheet, which transmits the incident first light beam and reflects other light beam. Therefore, the first light beam incident on the second light splitting sheet 12 is transmitted. The transmitted first light beam is scattered and reflected by the scattering element 13 behind the second light splitting sheet 12, and is transmitted to the second light splitting sheet 12. Then the transmitted first light beam is collimated by the collimating lens 14, and is then reflected to the light homogenizing assembly 16 by the first reflector 15. The homogenized first light beam is incident on the PCS 17, adjusted by the PCS 17, and then output to a spatial light modulator 18.

In an embodiment, the light source device 100 further includes an etendue increasing module, the etendue increasing module is a scattering element 13. The scattering element 13 is an etendue increasing module, the scattering element 13 can scatter and expand the first light beam to increase its etendue. In addition, the second light splitting sheet 12 provided on an incident path of the scattering element 13 can guide only the first light beam to the light path of the scattering element 13, so as to only scatter and expand the first light beam. If there is another light beam expanded at the same time, when light beams enter the light homogenizing assembly 16, a part of the light beams will be removed, resulting in waste of light and low utilization of light energy.

In an embodiment, the second light source module 1011 is a fluorescent light source, the fluorescent light source is generated from a part of the first light beam, the part of the first light beam emitted by the first light source module 101 is reflected by the reflective and transmissive wheel 5. The second light source module 1011 includes the first light source module 101, the reflective and transmissive wheel 5, the lens assembly 6, the third light splitting sheet 7 and the wavelength conversion device 8. The first light beam emitted by the first light source module 101 is reflected by the reflective and transmissive wheel 5, converged by the lens assembly 6, and emitted to the wavelength conversion device 8 via the third light splitting sheet 7. The wavelength conversion device 8 is excited to generate a second light beam, and the third light splitting sheet 7 reflects the generated second light beam.

It should be noted that, in other embodiments, the light of the second light source module is generated without using the first light source module.

In addition, in the embodiment shown in FIG. 1, the PCS transmits the first light beam and the second light beam having a polarization state perpendicular to a polarization state of the first light beam, and reflects the second light beam having a polarization state perpendicular to a polarization state of the first light beam. A ½ wave plate is provided on a light-exiting path of the second light beam having a polarization state perpendicular to a polarization state of the first light beam. It should be noted that, in this embodiment, the etendue of the first light beam is increased, the optical power density of the light incident to the PCS is lower than that in the prior art. Therefore, in the present disclosure, the use of the PCS in the prior art will not cause the problem of reliability reduction due to overheating and aging.

In an implementation, the first light source module is a blue laser light source, and the second light source module is yellow fluorescent light generated by excitation of a yellow phosphor powder by the blue laser light source. In addition, a third light source module is provided as required. The third light source module is a red laser light source 102 and/or a green laser light source 103. It should be noted that red laser light and/or green laser light have a larger light spot than a blue light spot, and when they are incident in the PCS, they will not cause overheating of the PCS and will not reduce the reliability of the PCS. If the etendue of the red, green and blue laser light spot are processed at the same time, the red and green laser light will suffer a lot of losses during light homogenization, which will affect the utilization of light energy.

In an embodiment, the second light splitting sheet 12 is a dichroic film that transmits blue light and reflects yellow light. Therefore, the red laser light and/or green laser light of a third light beam emitted by the red laser light source 102 and/or the green laser light source 103 is reflected by the second light splitting sheet 12. This avoids scattering of the red and/or green laser light by the scattering element 13, thereby avoiding an increase in the etendue of the red and/or green laser light.

Figure 2:
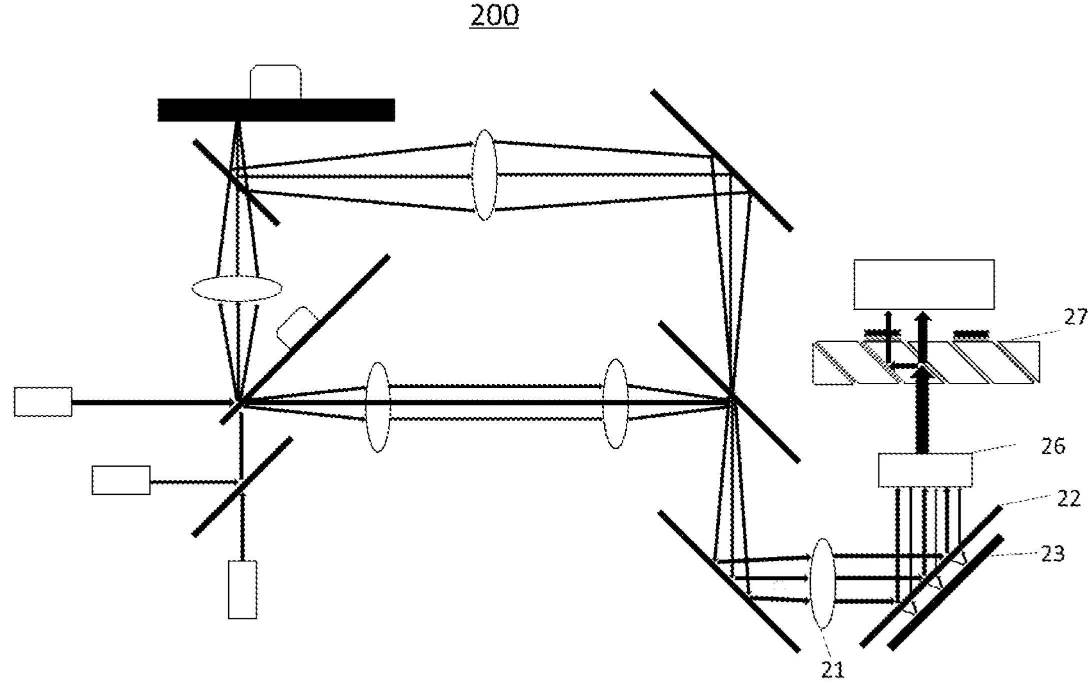
FIG. 2 is a schematic diagram of a light path of a light source device according to another embodiment of the present disclosure.

FIG. 2 is a schematic diagram of a light path of a light source device according to an embodiment of the present disclosure. A main difference between this embodiment and other embodiments is that a light splitting sheet 22 and a scattering element 23 are arranged on a light-exiting path of a collimating lens 21, that is, a light source is first collimated and then scattered. In case of a same diffusion angle, a longer propagation distance will present a larger-sized light spot. Compared with other embodiments, the distance between the scattering element 23 and a light homogenizing assembly 26 is smaller, such that the diffusion angle of the scattering element 23 is within a wider range, and the diffused light spot is still smaller than the incident range of the light homogenizing assembly 26.

Figure 3:
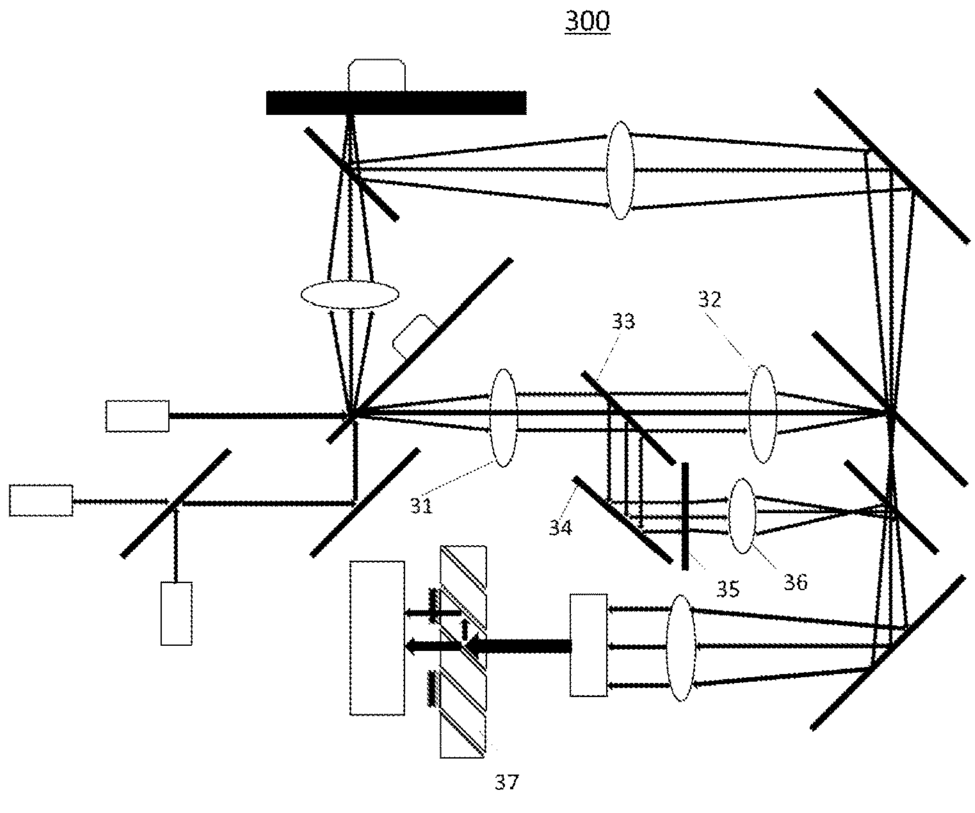
FIG. 3 is a schematic diagram of a light path of a light source device according to another embodiment of the present disclosure.

FIG. 3 is a schematic diagram of a light path of a light source device according to an embodiment of the present disclosure. A main difference between this embodiment and other embodiments is that a transmissive scattering element 35 is provided to increase the etendue of the first light beam emitted by the first light source module. The first light beam emitted by the first light source module and the third light beam emitted by the third light source module are collimated by a lens 31 and then incident on a light splitting sheet 33. The light splitting sheet 33 reflects the first light beam to a reflector 34 and transmits the third light beam to a lens 32. The first light beam is reflected by the reflector 34 and incident on the transmissive scattering element 35. Since then, the light path of the first light beam is separated from the light path of the third light beam. In this embodiment, the transmissive scattering element 35 can achieve a smaller diffusion angle, and has higher flexibility in terms of increasing the etendue of the first light beam.

Figure 4:
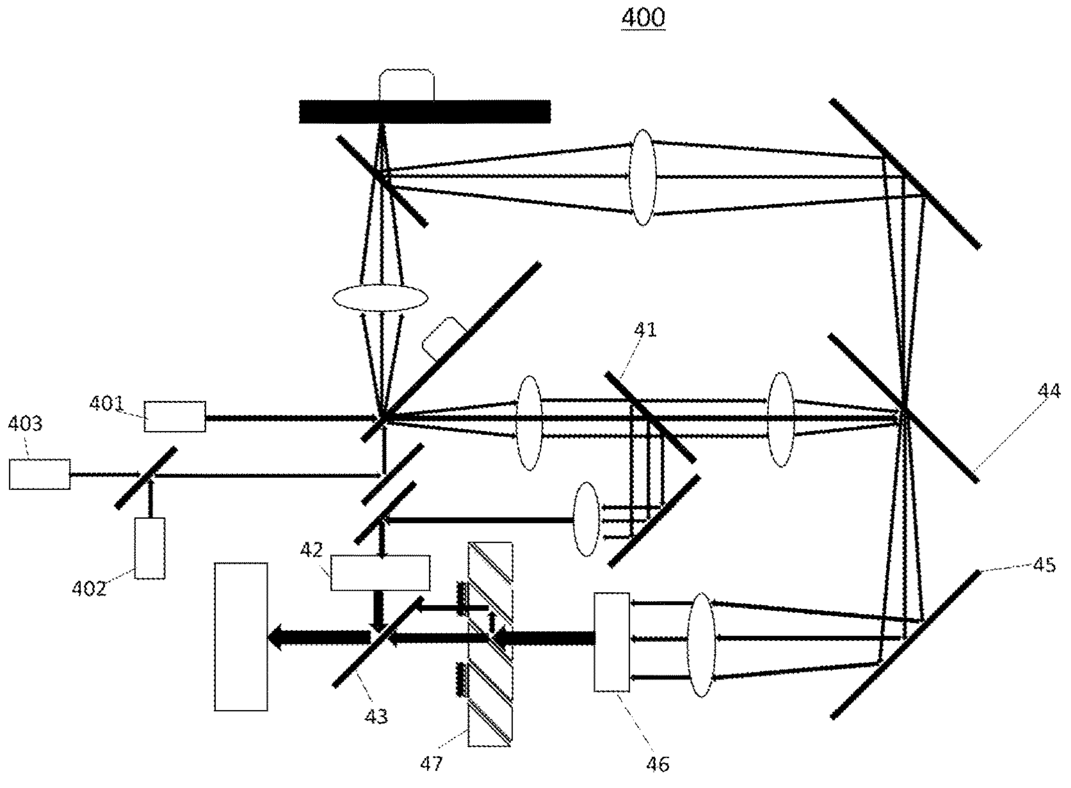
FIG. 4 is a schematic diagram of a light path of a light source device according to another embodiment of the present disclosure.

FIG. 4 is a schematic diagram of a light path of a light source device according to an embodiment of the present disclosure. This embodiment is different from other embodiments in that, the etendue increasing module is not provided, but a light path is configured in such a manner that the first light beam does not pass through the PCS, and the first light beam and the second light beam are combined on the light-exiting path of the PCS. Because the first light beam does not pass through the PCS, the problem of reliability reduction of the PCS caused by the first light beam incident on the PCS is solved.

In an embodiment, a light source device 400 includes a first light source module 401, a PCS 47 and a light combining module 43. The first light source module is configured to output a first light beam. A part of the first light beam is used as primary color light of the light source device, and another part of the first light beam is used as excitation light of the second light source module to excite a phosphor to output a second light beam. The etendue of the first light beam is smaller than the etendue of the second light beam. The PCS 47 is provided on a light path of the second light beam, and performs polarization conversion on the second light beam. The light combining module 43 is provided on a light-exiting path of the PCS 47, and combines the second light beam exited from the PCS and the first light beam not passed through the PCS 47.

Specifically, as shown in FIG. 4, the first light beam enters a first light homogenizing assembly 42 to be homogenized after been reflected by a light splitting sheet 41. After been homogenized, the first light beam is combined by a light combining module 43. The second light beam is homogenized by a second light homogenizing assembly 46 after transmitted through a area coating film 44, and then enters the PCS 47. The second light beam is performed polarization conversion by the PCS 47, and is then combined with the first light beam by the light combining module 43.

In an embodiment, a red laser light source module 402 and/or a green laser light source module 403 is further provided. The red laser light and/or the green laser light is transmitted through the light splitting sheet 41 and reflected by the area coating film 44 to enter the PCS 47.

Figure 5:
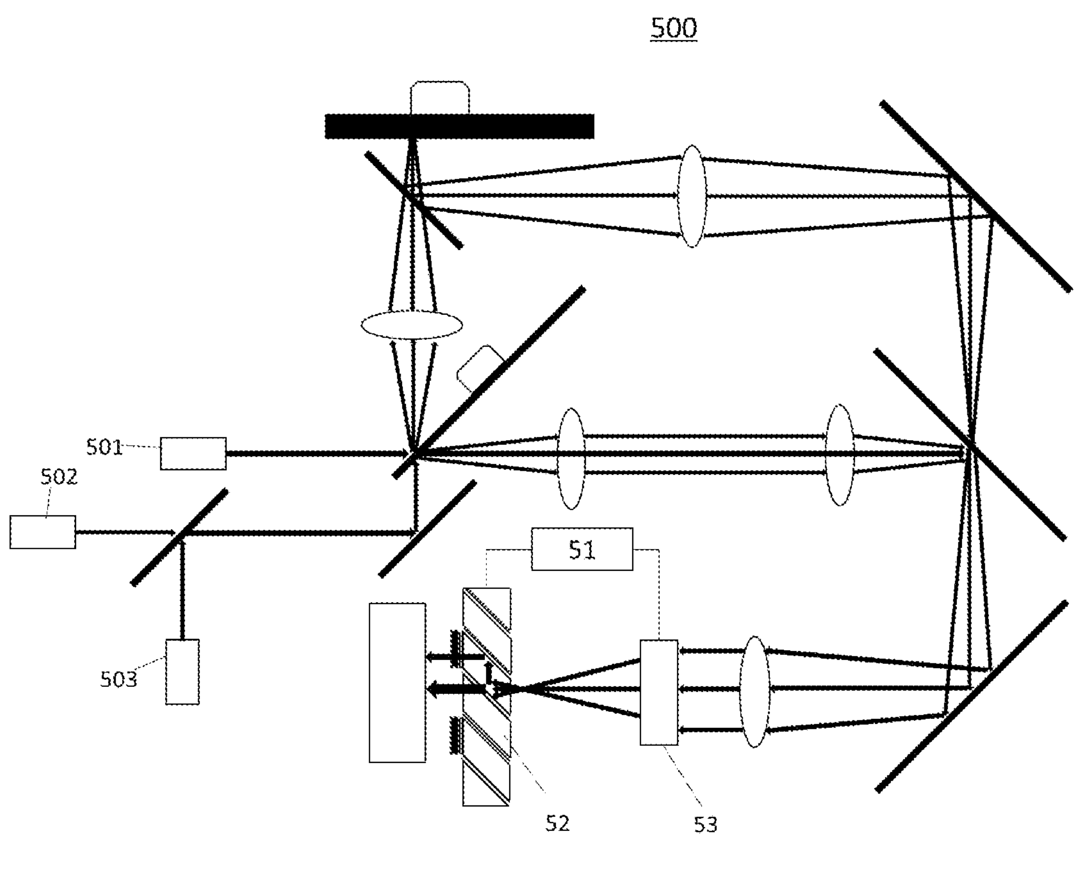
FIG. 5 is a schematic diagram of a light path of a light source device according to another embodiment of the present disclosure.

FIG. 5 is a schematic diagram of a light path of a light source device according to an embodiment of the present disclosure. This embodiment is different from other embodiments in that, in this embodiment, no scattering element is provided to scatter the first light beam output by a first light source module, but a distance adjustment module 51 is provided between a light homogenizing assembly 53 and a PCS 52. The distance adjustment module 51 can adjust a distance between the light homogenizing assembly 53 and the PCS 52, such that a distance from a spot focusing surface of the first light beam to the PCS 52 is deviated, so as to increase the etendue of the first light beam incident on the PCS 52, thereby improving the reliability of the PCS.

It should be noted that the distance adjustment module 51 adjusts the distance between the light homogenizing assembly 53 and the PCS 52 by various means, such as a spacer added during installation to adjust the distance, an adjustable device, or an offset distance introduced during design.

It should be noted that, in the above-mentioned embodiments, the PCS is configured to reflect fluorescent light and transmit laser light, but this does not constitute a limitation in the above-mentioned embodiments. The PCS in the above-mentioned embodiments may also adopt a PCS structure shown in FIG. 6 or FIG. 7.

Figures 6, 7:
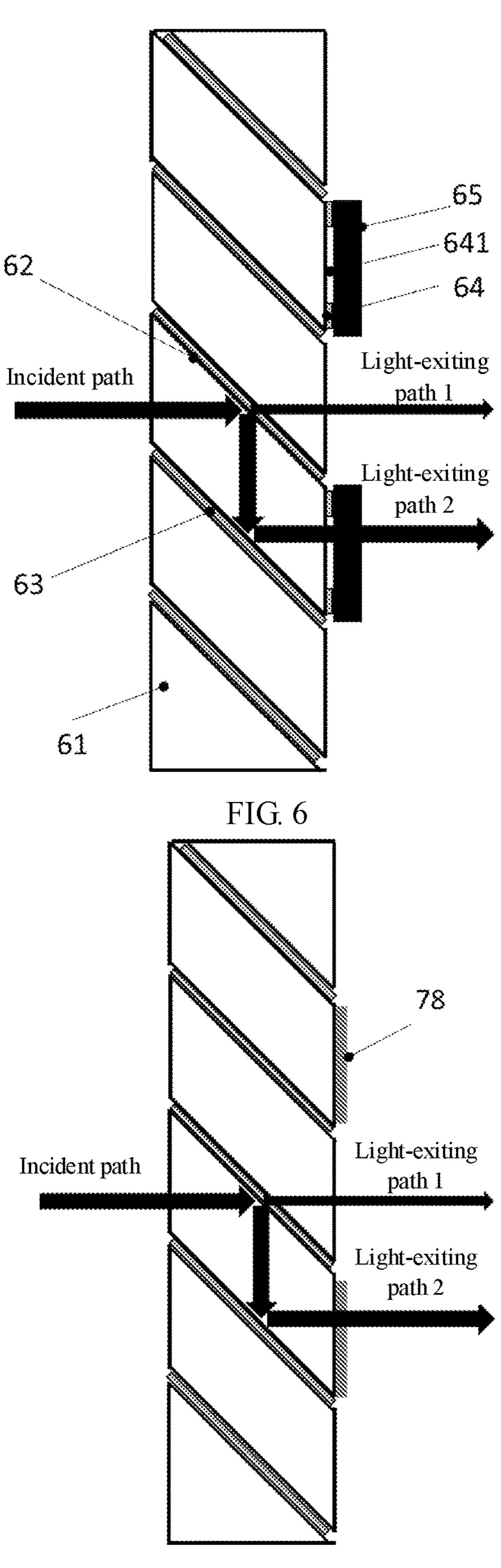
FIG. 6 is a structural diagram of a polarization conversion system (PCS) according to an embodiment of the present disclosure.
FIG. 7 is a structural diagram of a PCS according to another embodiment of the present disclosure.

FIG. 6 is a schematic diagram of a polarization conversion system (PCS) according to an embodiment of the present disclosure. Different from the PCS in the prior art, in this embodiment, the PCS includes polarization beam splitting prisms 61 and ½ wave plates 65. Two of the polarization beam splitting prisms 61 are connected together through a first material 63. A polarization beam splitting film 62 is provided on each of the polarization beam splitting prisms 61. The polarization beam splitting film 62 is configured to reflect the first light beam, convert a part of the second light beam into polarized light having the same polarization state as the first light beam and convert another part of the second light beam into polarized light having a polarization state perpendicular to a polarization state of the first light beam. The polarization beam splitting film 62 is also configured to reflect the second light beam having the same polarization state as the first light beam, and transmit the second light beam having a polarization state perpendicular to a polarization state of the first light beam. After the second light beam having a polarization state perpendicular to a polarization state of the first light beam is transmitted through the polarization beam splitting film 62, it passes through the first material 63 and exits through a light-exiting path 1.

Each of the ½ wave plates 65 is connected to a light-exiting path 2 of a respective one of the polarization beam splitting prisms 61 through a second material 64. Each of the ½ wave plates 65 is configured to convert the polarization state of the first light beam and the polarization state of the second light beam having the same polarization state as the first light beam. An air gap 641 that allows light to pass is formed by the second material 64.

By adopting the PCS structure in this embodiment, the PCS in the above-mentioned embodiments of the present disclosure can further reduce an influence on the reliability of the PCS which is caused by the incident blue laser light.

It should be noted that, in an embodiment, each of the ½ wave plates 65 is connected to the light-exiting path 1 in the manner shown in FIG. 6.

FIG. 7 is a schematic diagram of a PCS according to another embodiment of the present disclosure. A difference between the PCS structure in this embodiment and the PCS structure in other embodiments is that, in this embodiment, each of ½ wave plates 78 is a film coated on a light-exiting path of a respective one of polarization beam splitting prisms.

The PCS includes polarization beam splitting prisms and ½ wave plates 78. The polarization beam splitting prisms are connected through a first material. A polarization beam splittingfilm is provided on each of the polarization beam splitting prisms. The polarization beam splitting film is configured to reflect the first light beam, convert a part of the second light beam into polarized light having the same polarization state as the first light beam and another part of the second light beam into polarized light having a polarization state perpendicular to a polarization state of the first light beam. The polarization beam splitting film is also configured to reflect the second light beam having the same polarization state as the first light beam, and transmit the second light beam having a polarization state perpendicular to a polarization state of the first light beam. After the second light beam having a polarization state perpendicular to a polarization state of the first light beam is transmitted through the polarization beam splitting film, it exits from the first material. Each of the ½ wave plates 78 is a film coated on a light-exiting path of a respective one of the polarization beam splitting prisms.

It should be noted that, in an embodiment, each of the ½ wave plates 78 is provided on the light-exiting path of the first light beam, i.e., the light-exiting path 2 in FIG. 7, or is provided on the light-exiting path of the second light beam having a polarization state perpendicular to a polarization state of the first light beam, i.e., the light-exiting path 1 in FIG. 7.

In the present disclosure, the etendue of the first light beam is increased, so as to avoid the problem that the reliability of the PCS device is reduced due to overheating caused by excessive power density of the first light beam incident on the PCS. In addition, the present disclosure further provides a PCS, which can be applied to the light paths in the above embodiments to solve the problem of overheating of the PCS caused by the incident first light beam. In addition, the present disclosure further provides a light source device combining the first light beam and the second light beam on the light-exiting path of the PCS, which solves the problem that the first light beam incident on the PCS causes overheating and reliability reduction of the PCS.

The above described are merely some embodiments of the present disclosure, which do not constitute a limitation on a scope of the present disclosure. Any equivalent structure or equivalent process amendment made based on the description and drawings of the present disclosure, or direct or indirect application thereof in other related technical fields, shall fall into a scope of the present disclosure.

What is claimed is:

1. A light source device, comprising:

a first light source module configured to output a first light beam;

a second light source module configured to output a second light beam, wherein etendue of the first light beam is smaller than etendue of the second light beam;

a polarization conversion system configured to receive the first light beam and the second light beam and perform polarization conversion on at least one of the first light beam and the second light beam; and an etendue increasing module provided on a light path between the first light source module and the polarization conversion system and configured to increase the etendue of the first light beam and does not increase the etendue of the second light beam, wherein the etendue increasing module comprises a scattering element provided on the light path between the first light source module and the polarization conversion system, and wherein the scattering element is a reflective scattering element or a transmissive scattering element, a part of the first light beam is guided to a wavelength conversion device to generate the second light beam, wherein the light source device further comprises a third light source module and a second light splitting sheet, wherein the third light source module is configured to emit a third light beam having a wavelength different from a wavelength of the first light beam; and the second light splitting sheet is provided between the first light source module and the scattering element as well as provided between the third light source module and the scattering element, and is configured to guide the first light beam to a light path of the scattering element and guide the third light beam to a light path other than the light path of the scattering element.

2. The light source device according to claim 1, wherein the polarization conversion system comprises polarization beam splitting prisms and ½ wave plates;

wherein the polarization beam splitting prisms are connected through a first material;

wherein a polarization beam splitting film is provided on each of the polarization beam splitting prisms; and the polarization beam splitting film is configured to reflect the first light beam, convert a part of the second light beam into polarized light having the same polarization state as the first light beam and convert another part of the second light beam into polarized light having a polarization state perpendicular to a polarization state of the first light beam, reflect the second light beam having the same polarization state as the first light beam, and transmit the second light beam having a polarization state perpendicular to a polarization state of the first light beam;

wherein the second light beam having a polarization state perpendicular to a polarization state of the first light beam is transmitted through the polarization beam splitting prism film, and exits from the first material; and wherein each of the ½ wave plates is connected to a light-exiting path of a respective one of the polarization beam splitting prisms through a second material to convert the polarization state of the polarized light; and an air gap that allows light to pass is formed by the second material.

3. The light source device according to claim 2, wherein each of the ½ wave plates is arranged on a light-exiting path of the first light beam and the second light beam having the same polarization state as the first light beam, or is arranged on a light-exiting path of the second light beam having a polarization state perpendicular to a polarization state of the first light beam.

4. The light source device according to claim 1, wherein the polarization conversion system comprises polarization beam splitting prisms and ½ wave plates;

wherein the polarization beam splitting prisms are connected through a first material;

wherein a polarization beam splitting film is provided on each of the polarization beam splitting prisms; and the polarization beam splitting film is configured to reflect the first light beam, convert a part of the second light beam into polarized light having the same polarization state as the first light beam and convert another part of the second light beam into polarized light having a polarization state perpendicular to a polarization state of the first light beam, reflect the second light beam having the same polarization state as the first light beam, and transmit the second light beam having a polarization state perpendicular to a polarization state of the first light beam;

wherein the second light beam having a polarization state perpendicular to a polarization state of the first light beam is transmitted through the polarization beam splitting prism film, and exits from the first material; and wherein each of the ½ wave plates is a film coated on a light-exiting path of a respective one of the polarization beam splitting prisms.

5. The light source device according to claim 4, wherein each of the ½ wave plates is arranged on a light-exiting path of the first light beam and the second light beam having the same polarization state as the first light beam, or is arranged on a light-exiting path of the second light beam having a polarization state perpendicular to a polarization state of the first light beam.

6. The light source device according to claim 1, wherein the polarization conversion system comprises polarization beam splitting prisms and ½ wave plates;

wherein the polarization beam splitting prisms are connected through a first material;

wherein each of the ½ wave plates is connected to a respective one of the polarization beam splitting prisms through a second material;

wherein a polarization beam splitting film is provided on each of the polarization beam splitting prisms; and the polarization beam splitting prism film is configured to reflect the first light beam, convert a part of the second light beam into polarized light having the same polarization state as the first light beam and convert another part of the second light beam into polarized light having a polarization state perpendicular to a polarization state of the first light beam, reflect the second light beam having the same polarization state as the first light beam, and transmit the second light beam having a polarization state perpendicular to a polarization state of the first light beam; and wherein each of the ½ wave plates is provided on a light-exiting path of the second light beam having a polarization state perpendicular to a polarization state of the first light beam.

7. A light source device, comprising:

a first light source module configured to output a first light beam;

a second light source module configured to output a second light beam, wherein etendue of the first light beam is smaller than etendue of the second light beam;

a polarization conversion system configured to receive the first light beam and the second light beam and perform polarization conversion on at least one of the first light beam and the second light beam; and an etendue increasing module provided on a light path between the first light source module and the polarization conversion system and configured to increase the etendue of the first light beam and does not increase the etendue of the second light beam, wherein the light source device further comprises a wheel having at least one reflective section and at least one transmissive section and a wavelength conversion device, wherein the wheel having at least one reflective section and at least one transmissive section is provided on a light-exiting path of the first light source module, and is configured to guide a part of the first light beam to the wavelength conversion device to generate the second light beam.

8. The light source device according to claim 7, wherein the polarization conversion system comprises polarization beam splitting prisms and ½ wave plates;

wherein the polarization beam splitting prisms are connected through a first material;

wherein a polarization beam splitting film is provided on each of the polarization beam splitting prisms; and the polarization beam splitting film is configured to reflect the first light beam, convert a part of the second light beam into polarized light having the same polarization state as the first light beam and convert another part of the second light beam into polarized light having a polarization state perpendicular to a polarization state of the first light beam, reflect the second light beam having the same polarization state as the first light beam, and transmit the second light beam having a polarization state perpendicular to a polarization state of the first light beam;

wherein the second light beam having a polarization state perpendicular to a polarization state of the first light beam is transmitted through the polarization beam splitting prism film, and exits from the first material; and wherein each of the ½ wave plates is connected to a light-exiting path of a respective one of the polarization beam splitting prisms through a second material to convert the polarization state of the polarized light; and an air gap that allows light to pass is formed by the second material.

9. The light source device according to claim 7, wherein the polarization conversion system comprises polarization beam splitting prisms and ½ wave plates;

wherein the polarization beam splitting prisms are connected through a first material;

wherein a polarization beam splitting film is provided on each of the polarization beam splitting prisms; and the polarization beam splitting film is configured to reflect the first light beam, convert a part of the second light beam into polarized light having the same polarization state as the first light beam and convert another part of the second light beam into polarized light having a polarization state perpendicular to a polarization state of the first light beam, reflect the second light beam having the same polarization state as the first light beam, and transmit the second light beam having a polarization state perpendicular to a polarization state of the first light beam;

wherein the second light beam having a polarization state perpendicular to a polarization state of the first light beam is transmitted through the polarization beam splitting prism film, and exits from the first material; and wherein each of the ½ wave plates is a film coated on a light-exiting path of a respective one of the polarization beam splitting prisms.

10. A light source device, comprising:

a first light source module configured to output a first light beam;

a second light source module configured to output a second light beam, wherein etendue of the first light beam is smaller than etendue of the second light beam;

a polarization conversion system configured to receive the first light beam and the second light beam and perform polarization conversion on at least one of the first light beam and the second light beam; and an etendue increasing module provided on a light path between the first light source module and the polarization conversion system and configured to increase the etendue of the first light beam and does not increase the etendue of the second light beam, wherein the light source device further comprises a light homogenizing assembly arranged on a light path between the first light source module and the polarization conversion system, wherein the etendue increasing module is a distance adjusting module configured to adjust a distance between the light homogenizing assembly and the polarization conversion system.

11. The light source device according to claim 10, wherein the polarization conversion system comprises polarization beam splitting prisms and ½ wave plates;

wherein the polarization beam splitting prisms are connected through a first material;

wherein a polarization beam splitting film is provided on each of the polarization beam splitting prisms; and the polarization beam splitting film is configured to reflect the first light beam, convert a part of the second light beam into polarized light having the same polarization state as the first light beam and convert another part of the second light beam into polarized light having a polarization state perpendicular to a polarization state of the first light beam, reflect the second light beam having the same polarization state as the first light beam, and transmit the second light beam having a polarization state perpendicular to a polarization state of the first light beam;

wherein the second light beam having a polarization state perpendicular to a polarization state of the first light beam is transmitted through the polarization beam splitting prism film, and exits from the first material; and wherein each of the ½ wave plates is connected to a light-exiting path of a respective one of the polarization beam splitting prisms through a second material to convert the polarization state of the polarized light; and an air gap that allows light to pass is formed by the second material.

12. The light source device according to claim 10, wherein the polarization conversion system comprises polarization beam splitting prisms and ½ wave plates;

wherein the polarization beam splitting prisms are connected through a first material;

wherein a polarization beam splitting film is provided on each of the polarization beam splitting prisms; and the polarization beam splitting film is configured to reflect the first light beam, convert a part of the second light beam into polarized light having the same polarization state as the first light beam and convert another part of the second light beam into polarized light having a polarization state perpendicular to a polarization state of the first light beam, reflect the second light beam having the same polarization state as the first light beam, and transmit the second light beam having a polarization state perpendicular to a polarization state of the first light beam;

wherein the second light beam having a polarization state perpendicular to a polarization state of the first light beam is transmitted through the polarization beam splitting prism film, and exits from the first material; and wherein each of the ½ wave plates is a film coated on a light-exiting path of a respective one of the polarization beam splitting prisms.

13. The light source device according to claim 10, wherein the polarization conversion system comprises polarization beam splitting prisms and ½ wave plates;

wherein the polarization beam splitting prisms are connected through a first material;

wherein each of the ½ wave plates is connected to a respective one of the polarization beam splitting prisms through a second material;

wherein a polarization beam splitting film is provided on each of the polarization beam splitting prisms; and the polarization beam splitting prism film is configured to reflect the first light beam, convert a part of the second light beam into polarized light having the same polarization state as the first light beam and convert another part of the second light beam into polarized light having a polarization state perpendicular to a polarization state of the first light beam, reflect the second light beam having the same polarization state as the first light beam, and transmit the second light beam having a polarization state perpendicular to a polarization state of the first light beam; and wherein each of the ½ wave plates is provided on a light-exiting path of the second light beam having a polarization state perpendicular to a polarization state of the first light beam.

* * * * *